United States Patent Office.

JOHN WARD, OF EVANSVILLE, INDIANA.

Letters Patent No. 95,173, dated September 21, 1869; antedated September 13, 1869.

IMPROVED MEDICAL COMPOUND.

The Schedule referred to in these Letters Patent and making part of the same.

*To all whom it may concern:*

Be it known that I, JOHN WARD, of the city of Evansville, in the county of Vanderburg, and State of Indiana, have invented certain new and useful Improvements in Pacific Cure for Ague and Fever; and I do hereby declare that the following is a full, clear, and exact description thereof.

My invention relates to improvements in the method of curing ague and fever; and to this end, It consists in the employment of a chemical compound applied to the feet and hands, whereby the most obstinate cases are cured by one application.

To enable others skilled in the art to which my invention appertains, to make and use the same, I will now describe the compound and its operation.

Take two ounces of best brandy, one ounce of compound tincture of myrrh, one ounce of pulverized ginger, and two drachms of pulverized cardamom. Mix well together by boiling the same for three minutes; when cool, bathe the feet and hands of the invalid with the compound.

Having thus described my invention,

What I claim, and desire to secure by Letters Patent, is—

A preparation, compounded substantially in the manner and for the purposes described.

In testimony that I claim the foregoing as my own, I affix my signature, in presence of two witnesses:

JOHN WARD.

Witnesses:
H. A. MATTISON,
J. DAVIDSON.